(12) United States Patent
Ghosh et al.

(10) Patent No.: US 8,285,409 B2
(45) Date of Patent: Oct. 9, 2012

(54) EFFECTIVE CYCLE TIME MANAGEMENT EMPLOYING A MULTI-HORIZON MODEL

(75) Inventors: Soumyadip Ghosh, PeekSkill, NY (US); Jayant R. Kalagnanam, Tarrytown, NY (US); Dmitriy Katz-Rogozhnikov, Yorktown Heights, NY (US); James R. Luedtke, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/777,715

(22) Filed: May 11, 2010

(65) Prior Publication Data

US 2011/0282475 A1  Nov. 17, 2011

(51) Int. Cl.
 *G06F 19/00* (2011.01)
 *G06Q 10/00* (2012.01)
 *G06G 7/48* (2006.01)
(52) U.S. Cl. .................. 700/100; 705/7.26; 703/6
(58) Field of Classification Search .................. 700/100; 705/7.26; 703/6
 See application file for complete search history.

(56) References Cited

U.S. PATENT DOCUMENTS

| | | | | |
|---|---|---|---|---|
| 5,291,394 A * | 3/1994 | Chapman | ........... | 705/7.26 |
| 5,548,518 A * | 8/1996 | Dietrich et al. | ........... | 700/100 |
| 5,880,960 A * | 3/1999 | Lin et al. | ........... | 700/99 |
| 6,438,436 B1 * | 8/2002 | Hohkibara et al. | ........... | 700/97 |
| 6,957,113 B1 * | 10/2005 | Logsdon et al. | ........... | 700/100 |
| 6,963,785 B2 * | 11/2005 | Chen et al. | ........... | 700/100 |
| 7,463,939 B1 * | 12/2008 | Mata et al. | ........... | 700/100 |
| 7,856,287 B2 * | 12/2010 | Milne et al. | ........... | 700/100 |
| 8,005,560 B2 * | 8/2011 | Rawlins et al. | ........... | 700/100 |
| 8,170,703 B2 * | 5/2012 | Domrose | ........... | 700/100 |
| 2002/0107599 A1 * | 8/2002 | Patel et al. | ........... | 700/99 |

OTHER PUBLICATIONS

Fleischer, L. et al., "Efficient Algorithms for Separated Continuous Linear Programs: The Multicommodity Flow Problem with Holding Costs and Extensions" Mathematics of Operations Research (2005) pp. 916-938, vol. 30(4).
Dai, J.G. et al., "Maximum Pressure Policies in Stochastic Processing Networks" Operations Research (2005) pp. 197-218, vol. 53(2).
Leachman, R.C. et al., "SLIM: Short Cycle Time and Low Inventory in Manufacturing at Samsung Electronics" Interfaces (2002) pp. 61-76, vol. 32(1).

* cited by examiner

*Primary Examiner* — Mohammad Ali
*Assistant Examiner* — Sivalingam Sivanesan
(74) *Attorney, Agent, or Firm* — Scully, Scott, Murphy & Presser, P.C.; Daniel P. Morris, Esq.

(57) ABSTRACT

Cycle time and throughput of a manufacturing facility is effectively manages by a control system that employs a combination of a long-term horizon model and at least one short-term horizon model to generate control signals for a set of machines in a manufacturing facility. The long-term horizon model determines long-term average time allocation percentage for each machine for a given set of throughput targets and cycle time targets for products to be manufactured. Each of the at least one short-term horizon model determines queues for immediate use at processing tools, while the queues are subjected to a secondary adjustment based on the time allocation constraints generated by the long-term horizon model. The combination of the long-term and the at least one short-term horizon models provides a stable long-term proactive WIP bubble-management as well as short-term WIP bubble management.

25 Claims, 2 Drawing Sheets

EFFECTIVE CYCLE TIME MANAGEMENT EMPLOYING A MULTI-HORIZON MODEL

BACKGROUND

The present invention generally relates to a method and a system for providing control signals for operation of a plurality of machines in a manufacturing facility.

Many industrial products require multiple sequential processing steps during manufacturing. The quantity of manufactured industrial products in a production facility can be maximized by any one of many different production management systems depending on the nature of the products, the variety of the products, and the complexity of the processes employed during individual manufacturing steps, and the distribution and uniformity of processing time for each manufacturing step.

A production management system commonly employed to manufacture products that require a large number of processing steps is called a work-in-progress (WIP) management system. Metrics for measuring effectiveness of a WIP management system include average cycle time and average throughput. A cycle time is the time interval between beginning of the first processing step and the end of the last processing step for a product. The cycle time for any product divided by the raw processing time, i.e., the total time that the product actually spends during processing steps, is typically referred to as an X-factor. In other words, the X-factor for a given product is the ratio of the cycle time for a product to the raw processing time, which is the theoretical lower limit to the cycle time. Thus, the X-factor is a number equal to or greater than 1.0. A throughput is the amount of products that a manufacturing facility produces in a given time interval.

Optimal operation of a manufacturing facility can be effected by reducing the cycle times and increasing the throughput. However, there exists an efficiency frontier for these two goals of reducing the cycle time and increasing the throughput beyond which they become contradictory. Thus, at this frontier reducing the cycle time typically results in a reduction of the throughput, and increasing the throughput typically results in an increase in the cycle time.

However, a manufacturing facility's location vis-à-vis this efficiency curve is heavily dependent on the operations management system. Effective WIP management requires achieving the two goals simultaneously, or achieving at least one of the two goals without causing a substantial disadvantage with respect to the other goal.

BRIEF SUMMARY

Cycle time and throughput of a manufacturing facility is effectively managed by a control system that employs a combination of a long-term horizon model and at least one short-term horizon model to generate control signals for a set of machines in a manufacturing facility. The long-term horizon model determines long-term average time allocation percentage for each machine for a given set of throughput targets for products to be manufactured. Each of the at least one short-term horizon model determines queues for immediate use at processing tools, where the queues are subjected to a secondary adjustment based on the time allocation constraints generated by the long-term horizon model. The combination of the long-term and the at least one short-term horizon models provides for stable long-term proactive bubble-management as well as short-term bubble management. This results in the manufacturing facility operating at or close to its efficiency frontier, where the best cycle times are realized. An important characteristic of both the long-horizon and shorter horizon models is that they operate over the entire facility, while existent methods only model local groups within the facility.

According to an aspect of the present invention, a system for providing control signals for operation of a plurality of machines in a manufacturing facility is provided. The system including a computer and a communication means. The computer is configured to perform the steps of: determining, for each machine within a plurality of machines in a manufacturing facility, an optimal usage allocation for multiple types of products that are manufactured in the manufacturing facility by employing the computer; determining, for each machine within the plurality of machines in the manufacturing facility, a queue of lots to be processed under a constraint that, for each type of product in the manufacturing line, a long-term average of usage allocation is within a predetermined range from a corresponding optimal usage allocation by employing the computer; and transmitting control signals from the computer to the plurality of machines employing the communication means, wherein the control signals include the queues of lots.

According to another aspect of the present invention, a method for providing control signals for operation of a plurality of machines in a manufacturing facility is provided. The method includes: determining, for each machine within a plurality of machines in a manufacturing facility, an optimal usage allocation for multiple types of products that are manufactured in the manufacturing facility by employing a computer; determining, for each machine within the plurality of machines in the manufacturing facility, a queue of lots to be processed under a constraint that, for each type of product in the manufacturing line, a long-term average of usage allocation is within a predetermined range from a corresponding optimal usage allocation by employing the computer; and transmitting control signals from the computer to the plurality of machines employing communication means, wherein the control signals include the queues of lots.

According to still another aspect of the present invention, a computer program product for providing control signals for operation of a plurality of machines in a manufacturing facility is provided. The computer program product includes a computer readable storage medium having computer readable program code embodied therewith. The computer readable program code is configured to perform the steps of: determining, for each machine within the plurality of machines in the manufacturing facility, an optimal usage allocation for multiple types of products that are manufactured in the manufacturing facility by employing a computer that is configured to read the computer program code; determining, for each machine within the plurality of machines in the manufacturing facility, a queue of lots to be processed under a constraint that, for each type of product in the manufacturing line, a long-term average of usage allocation is within a predetermined range from a corresponding optimal usage allocation by employing the computer; and transmitting control signals from the computer to the plurality of machines employing the communication means, wherein the control signals include the queues of lots. The computer program product can run on a processor platform to perform one or more of the moving-average-based set of linear combinations and the standard-deviation-based linear combination.

DETAILED DESCRIPTION

Figure 1:
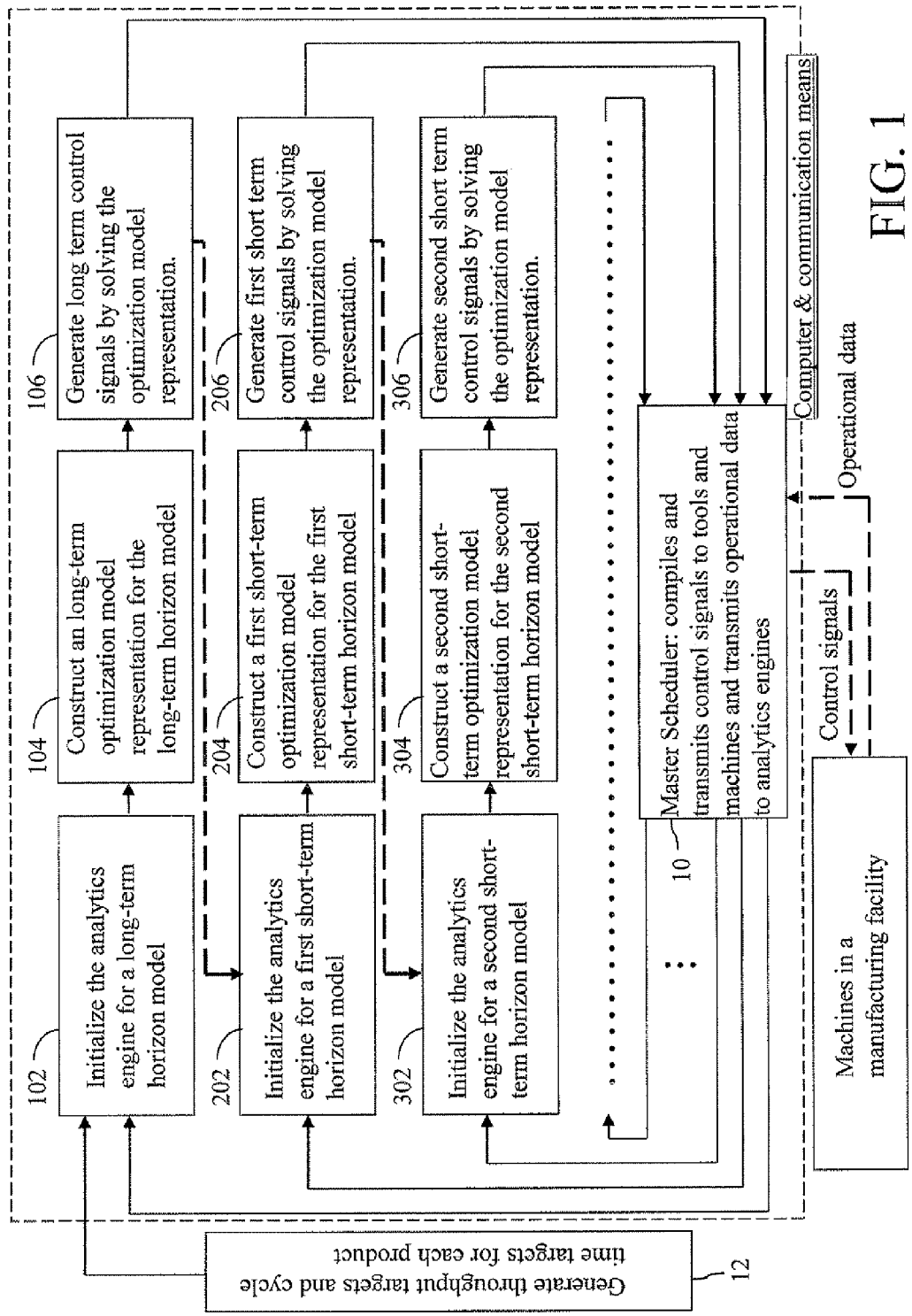
FIG. 1 is a flow chart showing the steps employed to provide control signals for operation of a plurality of machines in a manufacturing facility according to an embodiment of the present invention.

A method and a system for effective cycle time management employing a multi-horizon model for a manufacturing facility are now described in detail with accompanying figures.

As used herein, a "manufacturing facility" refers to any facility operated for the purpose of manufacturing goods.

As used herein, a "processing step" refers to step performed at a manufacturing facility in which a processing is performed to as a part of an overall manufacturing process.

As used herein, a "throughput" refers to the amount of goods manufactured in a manufacturing facility or the amount of goods processed through a given subset of processing steps within a manufacturing facility.

As used herein, a "cycle time" refers to the average time that it takes to manufacture a type of goods from a first processing step to a last processing step in a manufacturing facility.

As used herein, a "machine" or a "workstation" refers to any instrumentation, tool, machinery, or instrumentation that is employed to perform at least one processing step in a manufacturing facility.

As used herein, a "processing sequence" refers to a sequence of processing steps that are employed at a manufacturing facility to manufacture a product.

As used herein, a "raw process time" refers to a mathematical sum of all time that a good spends within machines for any given processing sequence.

As used herein, a "lot" refers to a unit quantity of products that are processed in a single processing step. A lot is also referred to as a "job."

As used herein, a "range" refers to a group of processing steps through which a type of product is planned to be processed within a unit time. The unit time may be a day, or any fixed time interval.

As used herein, "usage" of a machine refers to use of the available time of a machine for the purpose of running a processing step on one or more lot in a manufacturing facility.

As used herein, "usage allocation" or "workstation usage allocation" of a machine or a workstation refers to allocation of available time on the machine to each type of product that is manufactured in a manufacturing facility.

As used herein, a "work-in-progress" or "WIP" refers to the quantity of products of a given product type within a given range.

As used herein, a "WIP distribution" refers to a complete set of WIP for a given product type.

As used herein, a "bubble" or a "WIP bubble" refers to an unplanned anomalously high WIP at any machine in a WIP distribution.

As used herein, "bubble management" refers to any method or scheme intended to avoid a bubble in a WIP distribution.

As used herein, a "work-in-progress management system" or a "WIP management system" refers to any system employed to manage a WIP distribution over time.

As used herein, a "semiconductor chip" refers to any chip including at least one semiconductor device.

As used herein, a "semiconductor device manufacturing facility" is a manufacturing facility that is employed to manufacture semiconductor chips that include semiconductor devices.

As used herein, a "queue" refers to a temporal order of lots to be processed at a processing step at any given machine in a manufacturing facility.

As used herein, a "queuing-network" refers to a collection of queues that are interrelated by a processing sequence for a given product.

As used herein, a "horizon" refers to an amount of time interval from the present into the future that is predetermined for the purpose of planning an operation of a manufacturing facility.

As used herein, a "short-term horizon" refers to a horizon that is relevant to determination of a queue for any machine based on projected movement of individual lots.

As used herein, a "long-term horizon" refers to a horizon that is relevant to determination of optimal fraction of time that each machine in a manufacturing facility should be used for in a manufacturing facility.

As used herein, a "horizon model" refers to a model for generating control decisions to be implemented during a selected horizon.

As used herein, a "short-term horizon model" refers to a horizon model for which the horizon is a short-term horizon.

As used herein, a "long-term horizon model" refers to a horizon model for which the horizon is a long-term horizon.

As used herein, an "analytics engine" refers to a formal mathematical model.

As used herein, "queuing-network analytics engine" refers to an analytics engine for networks of queues.

As used herein, an "optimization model representation" refers to any mathematical model for determining a set of optimization parameters therefrom subject to boundary conditions of the mathematical model.

As used herein, a "control signals" refers to any signal that is employed to control the operation of any machine.

As used herein, "operational data" refers to any data generated from a machine that indicates the operational status of the machine.

As used herein, a "communication means" refers to any device configured to transmit electronic data to, or receive electronic data from, any machine in a manufacturing facility.

Referring to FIG. 1, a flow chart shows the steps according to an embodiment of the present invention. These steps can be employed to provide control signals for operation of a plurality of machines in a manufacturing facility.

Referring to step 10, a computer at a manufacturing facility receives operational data from machines in a manufacturing facility. The manufacturing facility employs a plurality of machines, which are employed to manufacture at least one type of product. The at least one type of product can be a plurality of types of products.

In one embodiment, the manufacturing facility is a semiconductor device manufacturing facility that manufactures various types of semiconductor chips. The number of processing steps employed to manufacture a semiconductor chip can be from 200 steps to 1,000 steps, although lesser and greater number of processing steps can also be employed.

A manufacturing facility typically employs at least tens of machines, and can employ hundreds or even thousands of machines. Each machine has an associated queue, which determines the sequence of lots to be processed in that machine. Each machine is also equipped with a communication device configured to transmit data on the operational data of the machine to the computer. The operational data includes whether the machine is currently in operation, and the estimated time for availability in case the machine is not currently in operation. Further, the operational data includes, but is not limited to, a list of lots that are currently processed in the machine, a list of lots that have finished processing and waiting to be transferred to another machine or a stocker, i.e., a machine configured to store lots, and a list of lots that are waiting to be processed at that machine. In addition, the operational data can include the remaining processing time for the lots that are currently processed in that machine and/or future maintenance schedule on the machine, during which period the machine will not be available.

A master scheduler program in the computer manages the operational data upon receipt from the machines in the manufacturing facility. The master scheduler program triggers performance of multiple programs to generate control signals to the machines in the manufacturing facility.

Referring to step 12, throughput targets and cycle time targets can be optionally generated as boundary conditions for determining control signals for the machine in the manufacturing facility. The throughput targets and cycle time targets can be generated for a limited set of product types to be manufactured in the manufacturing facility. Because the capability to generate control signals that meet the boundary conditions depend on the nature and severity of limitations that the boundary conditions impose, the boundary conditions are selected in a manner that enables a solution in the form of optimal usage allocations and/or a set of control signals designed to meet the boundary conditions.

For example, the boundary conditions can include a throughput target or a cycle time target for each of the multiple types of products to be manufactured in the manufacturing facility. Each component of the boundary conditions can be provided as targets or absolute limits not to be exceeded. The generation of the boundary conditions is effected by consideration for business needs, analysis of past performance of the manufacturing facility, a combination of both, or any other reasonable business methods. Transmission of the throughput targets and/or cycle time targets to the computer can be effected by an input means for inputting boundary conditions. The input means can be an automated data transmission device or a manual input device such as a keyboard or a mouse. The input means can be a part of the computer, or can be a separate device connected to the computer through a wireless or wire connection.

Referring to step 102, the operational data and the optional boundary conditions are transmitted to a long-term analytics engine embodying a long-term horizon model. The long-term horizon model is a horizon model having a horizon that is greater than ⅓ of an average raw process time, i.e., the average of the raw process times for all products under manufacture in the manufacturing facility. For example, the average raw process time for semiconductor chips manufactured in a semiconductor device manufacturing facility is typically from 3 weeks to 6 weeks. The average raw process time varies depending on the types of products in the manufacturing facility and the complexity of the processing steps employed in the manufacturing facility. In a semiconductor device manufacturing facility, the horizon for the long-term horizon model is typically greater than two weeks. In one embodiment, the horizon for the long-term horizon model can be equal to or greater than a month. In another embodiment, the horizon for the long-term horizon model can be equal to or greater than one quarter.

The long-term analytics engine embodying the long-term horizon model is initialized by the operational data transmitted from the master scheduler program and the optionally provided the throughput targets for each product type and/or the optionally provided cycle time targets for each product type. The initialization of the long-term analytics engine defines a mathematical problem to be solved subject to the optional boundary conditions or subject to the general condition that all cycle times for all existing product types should be minimized and throughput should be maximized for all existing product types in the manufacturing line.

Referring to step 104, a long-term optimization model representation is automatically constructed from the long-term analytics engine by the computer. The long-term optimization model representation is a set of mathematical equalities and inequalities. For example, this model can be built based on a multiple-workstation multiple-class queuing network construct called a fluid model of the network. This model captures the essential long-term dynamics of the entire facility in a single model and yields powerful results. Our embodiment models ahead into a long horizon, which can be a month or a quarter, and identifies ideal operating parameters that optimizes long-term throughput goals. These parameters include (but are not limited to) the best work allocation of each tool's up-time to each type of product, the best mix of products to support for maximum revenue and the ideal WIP levels at each tool to minimize cycle time mean and/or variability. Examples of models that achieve a limited subset of these objectives include Fleisher and Sethuraman, "Efficient Algorithms for Separated Continuous Linear Programs: The Multicommodity Flow Problem with Holding Costs and Extensions," Mathematics of Operations Research, Vol. 30, No. 4, November 2005, pp. 916-938 (2005), Dai and Lin, "Maximum Pressure Policies in Stochastic Processing Networks," Operations Research, Vol. 53, No. 2, March-April 2005, pp. 197-218 (2005), which are incorporated herein by reference. The set of mathematical equalities and inequalities is formulated to define optimal usage allocations for the machines in the manufacturing facility as unknown variables. In other words, the unknown variables represent what fraction of available time for each machine is to be used for each type of product in the manufacturing line over a long term, which is the horizon of the long-term horizon model. The long-term optimization model representation can be in any mathematical form representing a multi-variable optimization problem subject to limitations of the boundary conditions. The long-term optimization model representation can be solved by analytical methods, by an iterative convergence to a solution, by a statistical method such as Monte Carlo simulations, or a combination of any of the above.

For example, for each machine with an index i and for each type j of product manufactured in the production line, $f_{ij}$ represents the fraction of available operational time of machine i that is to be used to manufacture lots of the product type j. Thus, if the manufacturing line employs a total of M machines to manufacture a total of T types of products, the total number of unknown variables in the long-term optimization model representation is M×T.

Referring to step 106, the optimal usage allocations is determined for each machine in the manufacturing line by solving the long-term optimization model representation for the unknown variables, i.e., the optimal usage allocations. The long-term optimization model representation is solved subject to specific boundary conditions provided at step 12 or, in the absence of such specific boundary conditions, subject to the general boundary conditions of minimizing the cycle times and maximizing the total throughput. For each machine having an index of j, the sum of the values of $f_{ij}$'s for all values of i is equal to 1.0. Each value of $f_{ij}$ is in the range from 0.0 to 1.0. The optimal usage allocations embodied in a complete set of queues constitute long-term control signals, which are stored in the master scheduler and transmitted to the machines in the manufacturing facility.

The cycle of steps 10, 102, 104, and 106 is performed at a frequency proportional to the horizon of the long-term horizon model. Preferably, the cycle of steps 10, 102, 104, and 106 is performed multiple times within the horizon of the long-term horizon model. In one embodiment, the cycle of steps 10, 102, 104, and 106 is performed at a frequency that exceeds the greatest of all time horizons of at least one short-term horizon model. The steps of 102, 104, and 106 collectively determine, for each machine in the manufacturing facility, an optimal usage allocation for multiple types of products that are manufactured in the manufacturing facility by employing the computer. The optimal usage allocation determined at steps 102, 104, and 106 has the effect of avoiding WIP bubbles. This is induced by the mathematical constraints in the long-term model constructed in step 104, which ensure that tools are allocated workloads that can be handled in stable operating conditions. The short-term models of steps 204, 304 etc. then impose constraints within their model to ensure that these stability-ensuring allocations are adhered to. Thus, the optimal usage allocation stabilizes throughput over a long term on a time scale on par with the horizon of the long-term horizon model.

Referring to step 202, the operational data is transmitted to a first short-term analytics engine embodying a first short-term horizon model. The first short-term horizon model is a horizon model having a horizon that is less than ⅓ of the average raw process time in the manufacturing facility. The horizon for the first short-term horizon model is less than the horizon for the long-term horizon model. Typically, the horizon for the first short-term horizon model is less than one half of the horizon for the long-term horizon model, and is more typically, less than ⅐ of the horizon for the long-term horizon model. In a semiconductor device manufacturing facility, the horizon for the first short-term horizon model is typically less than one week. In one embodiment, the horizon for the first short-term horizon model can be equal to or less than one day. In another embodiment, the horizon for the first short-term horizon model can be equal to or less than six hours, or can be equal to or less than one hour.

The first short-term analytics engine embodying the first short-term horizon model is initialized by the operational data transmitted from the master scheduler program for each product type. Further, the optimal usage allocations, i.e., the complete set of coefficients $f_{ij}$'s calculated at step 106, are transmitted to the first short-term analytics engine as boundary conditions. The initialization of the first short-term analytics engine defines a mathematical problem to be solved subject to the boundary conditions in the form of the complete set of coefficients $f_{ij}$'s.

Referring to step 204, a first short-term optimization model representation is automatically constructed from the first short-term analytics engine by the computer. The first short-term optimization model representation is a set of mathematical equalities and inequalities. For example, this model may concern with the tool allocation of all lots that either are present in the system currently or will enter the facility over the horizon of the model. It determines lot dispatches to tools to improve overall cycle time and/or throughput for the duration of the short term horizon while minimizing the occurrences of WIP bubbles due to processing uncertainties and adhering to the long-term allocation goals $f_{ij}$. Models in this horizon can consider additional details like actual current tool capacities due to downtimes for repair and maintenance, and current WIP distributions, and can exploit tool flexibility in processing lots to squeeze out additional benefits to cycle time or throughput. Leachman et al., "SLIM: Short Cycle Time and Low Inventory in Manufacturing at Samsung Electronics," Interfaces, Vol. 32, No. 1, January-February (2002), which is incorporated herein by reference, provides a limited example of such a lot queue determination procedure, but they do not use a formal optimization procedure, or consider the long-term stability ensuring workstation allocation fractions. The set of mathematical equalities and inequalities is formulated to define a queue of lots to be processed at each machine in the manufacturing facility as unknown variables. In other words, the unknown variables represent a collection of queues for the manufacturing facility, or a queuing network for the manufacturing facility. The first short-term optimization model representation can be in any mathematical form representing a multi-variable optimization problem subject to limitations of the boundary conditions. The first short-term optimization model representation can be solved by analytical methods, by an iterative convergence to a solution, by a statistical method such as Monte Carlo simulations, or a combination of any of the above.

For example, for each machine with an index i, a variable in the form of a queue, $Q_i$ is present in the first short-term optimization model representation. The queue, $Q_i$ includes a list of lots to be sequentially processed in the machine with the index i.

Referring to step 206, a complete set of queues is determined for the machines in the manufacturing line by solving the first short-term optimization model representation for the unknown variables, i.e., the queue, $Q_i$, wherein the index i runs from 1 to M, i.e., the number of machines in the manufacturing facility. The first short-term optimization model representation is solved subject to the boundary conditions provided at step 106. Thus, the solution for each queue complies with the boundary conditions of compliance with the optimal usage allocations as determined at step 106. Each queue defines the temporal order of lots to be processed at each corresponding machine. Because each machine in a manufacturing facility has a corresponding queue, the number of queues is the same as the number of machines in the manufacturing facility. Further, each queue of lots is sorted subject to the general boundary conditions that short-term WIP bubbles are avoided at the machine associated with the queue. In one embodiment, each queue of lots can be sorted subject to the additional boundary conditions that cycle times are minimized and throughputs are maximized at the machine associated with the queue. In another embodiment, each queue of lots can be sorted subject to the additional boundary conditions that cycle times are minimized and throughputs are maximized in at least one range associated with the machine. The complete set of queues of lots, i.e., the queuing network, is included in first short-term control signals, which are stored in the master scheduler. The first short-term control signals can be transmitted to the machines in the manufacturing facility, or alternately, can be modified by additional steps that are designed to refine the first short-term control signals.

The cycle of steps 10, 202, 204, and 206 is performed at a frequency proportional to the horizon of the first short-term horizon model. Preferably, the cycle of steps 10, 202, 204, and 206 is performed multiple times within the horizon of the first short-term horizon model. If any additional short-term horizon model is to be subsequently employed, for example, at steps 302, 304, and 306, the cycle of steps 10, 202, 204, and 206 is performed at a frequency that exceeds the greatest of all time horizons of any subsequent short-term horizon models. The steps of 202, 204, and 206 collectively determine, for each machine in the manufacturing facility, a queue of lots that are to be sequentially processed, i.e., in a temporal order. The queuing network determined at steps 202, 204, and 206 has the effect of avoiding local WIP bubbles, i.e., WIP bubbles at each machine or in a range including a processing step performed at the machine, and thereby stabilizing throughput from the machine over a short term on a time scale on par with the horizon of the first short-term horizon model.

Any number of additional cycles of steps can be employed. Each cycle of steps employs an additional short-term horizontal model having a horizon that is shorter than previously employed horizons, including the horizon of the long-term horizon model and the first short-term horizon model. Such additional cycles of steps are optional, and when present, can be used to refine the queuing network to improve performance of the system, i.e., to increase the average throughput and decrease the average cycle time.

For the purpose of illustration of such an additional cycle of steps, steps employing a second short-term horizon model are described. These steps include steps 302, 304, and 306 in FIG. 1. It is understood that the description of steps 302, 304, and 306 can be extended to any steps in an additional cycle employing another short-term horizon model.

Referring to step 302, the operational data is transmitted to a second short-term analytics engine embodying a second short-term horizon model. Further, the complete set of coefficients $f_{ij}$'s is transmitted as additional boundary conditions from step 206. The second short-term horizon model is a horizon model having a horizon that is less than the horizon of the long-term horizon model and the horizon of the first short-term horizon model. In one embodiment, the horizon for the second short-term horizon model can be equal to or less than six hours. In another embodiment, the horizon for the second short-term horizon model can be equal to or less than 1 hour, or can be equal to or less than one 5 minutes.

The second short-term analytics engine embodying the second short-term horizon model is initialized by the operational data transmitted from the master scheduler program for each product type. Further, the queuing network calculated at step 206 is transmitted to the second short-term analytics engine as initial conditions. The initialization of the second short-term analytics engine defines a mathematical problem to be solved subject to the boundary conditions in the form of the complete set of coefficients $f_{ij}$'s.

Referring to step 304, a second short-term optimization model representation is automatically constructed from the second short-term analytics engine by the computer. The second short-term optimization model representation is a set of mathematical equalities and inequalities. For example, in an embodiment the second short-term model takes as inputs the output of the long-term model and the first short-term model to determine which tools are critical to maintaining full throughput over the duration of the first short term model's horizon. (This horizon can be a day or 6 hours.) A tool is critical if its lot allocation requires it to continuously process lots throughout the horizon with no idle time, and any idling of these tools due to lack of work will cause degradation in overall throughput progress in the horizon. The second short term model also takes as additional inputs a detailed representation of the current state of the manufacturing facility as a whole, which allows it to determine if certain lot-allocation decisions in the first short term model cannot be met because of uncertainties unforeseen in that short-term model, for example the stochastic nature of processing times, or lot transportation delay between tools. The second short term model then modifies the lot-to-tool allocations as needed to ensure that the current horizon's critical tools are not starved for lots. The set of mathematical equalities and inequalities is formulated to define a queue of lots to be processed at each machine in the manufacturing facility as unknown variables. In other words, the unknown variables are the queuing network. However, a complete set of initial values for the queuing network is provided at step 206. Thus, the second short-term optimization model representation is an iterative formulation that modifies the provided set of initial values for the queuing network only to the degree that the second short-term optimization model representation permits under relevant operational data from the master scheduler program. Typically, the relevant operational data is temporally limited to data within a time scale on par with the horizon of the second short-term horizon model. The second short-term optimization model representation can be in any mathematical form representing a multi-variable optimization problem subject to limitations of the boundary conditions and initial conditions. The second short-term optimization model representation can be solved by analytical methods, by an iterative convergence to a solution, by a statistical method such as Monte Carlo simulations, or a combination of any of the above.

Referring to step 206, a complete set of queues is determined for the machines in the manufacturing line by solving the second short-term optimization model representation for the unknown variables, i.e., the queue, $Q_i$, wherein the index i runs from 1 to M, i.e., the number of machines in the manufacturing facility. The complete set of queues as determined at step 306 is an iterative modification of the complete set of queues as determined at step 206 based on short-term data among the operational data stored in the master scheduler program. Like the solution obtained at step 206, the solution obtained at step 306 complies with the boundary conditions of compliance with the optimal usage allocations as determined at step 106 at each queue. The iteration at steps 302, 304, and 306 has the effect of further reducing short-term WIP bubbles.

The complete set of queues of lots, i.e., the queuing network, is included in second short-term control signals, which are stored in the master scheduler. The second short-term control signals can be transmitted to the machines in the manufacturing facility, or alternately, can be modified by additional steps that are designed to refine the second short-term control signals.

The system represented in FIG. 1 provides control signals for operation of a plurality of machines in a manufacturing facility. The system including a computer and a communication means. The computer is configured to perform, at steps 102, 104, and 106, the step of determining, for each machine within a plurality of machines in a manufacturing facility, an optimal usage allocation for multiple types of products that are manufactured in the manufacturing facility by employing the computer. Further, the computer is configured to perform, at steps 202, 204, and 206, and optionally at steps 302, 304, and 306, the step of determining, for each machine within the plurality of machines in the manufacturing facility, a queue of lots to be processed under a constraint that, for each type of product in the manufacturing line, a long-term average of usage allocation is within a predetermined range from a corresponding optimal usage allocation by employing the computer. Further, the computer is configured to perform, upon determination of the queue of lots, or queuing network, either at step 206 or at 306, the transmission of the control signals from the computer to the plurality of machines employing the communication means, wherein the control signals include the queues of lots.

The step of determining the optimal usage allocations is effected by solving a long-term horizon model, and the step of determining the queues of lots is effected by solving at least one short-term horizon model. The at least one short-term model can be a single short-term model such as the first short-term horizon model. Alternately, the at least one short-term model can be a plurality of models such as the combination of the first short-term horizon model and the second short-term horizon model. The horizon for the long-term horizon model is a period of time that is longer than any horizon for the at least one short-term horizon model. If the at least one short-term horizon model is a plurality of short-term horizon models, horizons of the plurality of short-term horizon models are different from one another. For example, the horizon of the (i+1)-th short-term horizon model is shorter than the horizon of the i-th short-term horizon model for each positive integer i.

If the manufacturing facility is a semiconductor device manufacturing facility, the horizon for the long-term horizon model is at least one week, and each of the at least one short-term horizon model has a horizon that is less than one week. For example, the horizon for the long-term horizon model can be within a factor of 2 of a month, i.e., from half a month to two months, the horizon for the first short-term horizon model can be within a factor of 2 of a day, i.e., from 12 hours to 48 hours, and the horizon for the second short-term horizon model can be within a factor of 5 of 5 minutes, i.e., from 1 minute to 25 minutes.

In one embodiment, the horizon of the long-term horizon model is greater than the greatest horizon among the horizons of the at least one short-term horizon models by a factor of 2 or more. In another embodiment, the horizon of the i-th short-term horizon model is greater than the horizon of the (i+1)-th short-term horizon model by a factor of 2 or more for all positive integer i. In yet another embodiment, the computer is configured to perform the step of determining the queues of lots at least twice during a time interval between two consecutive performances of the step of determining the optimal usage allocations. In still another embodiment, the computer is configured to perform the step of determining, i.e., iteratively modifying, the queues of lots at least twice employing the (i+1)-th short-term horizon model during a time interval between two consecutive performances of the step of determining the queues of lots at least twice employing the i-th short-term horizon model for all positive integer i.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIG. 1 illustrates the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated or run substantially concurrently, or the blocks may sometimes be operated or run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
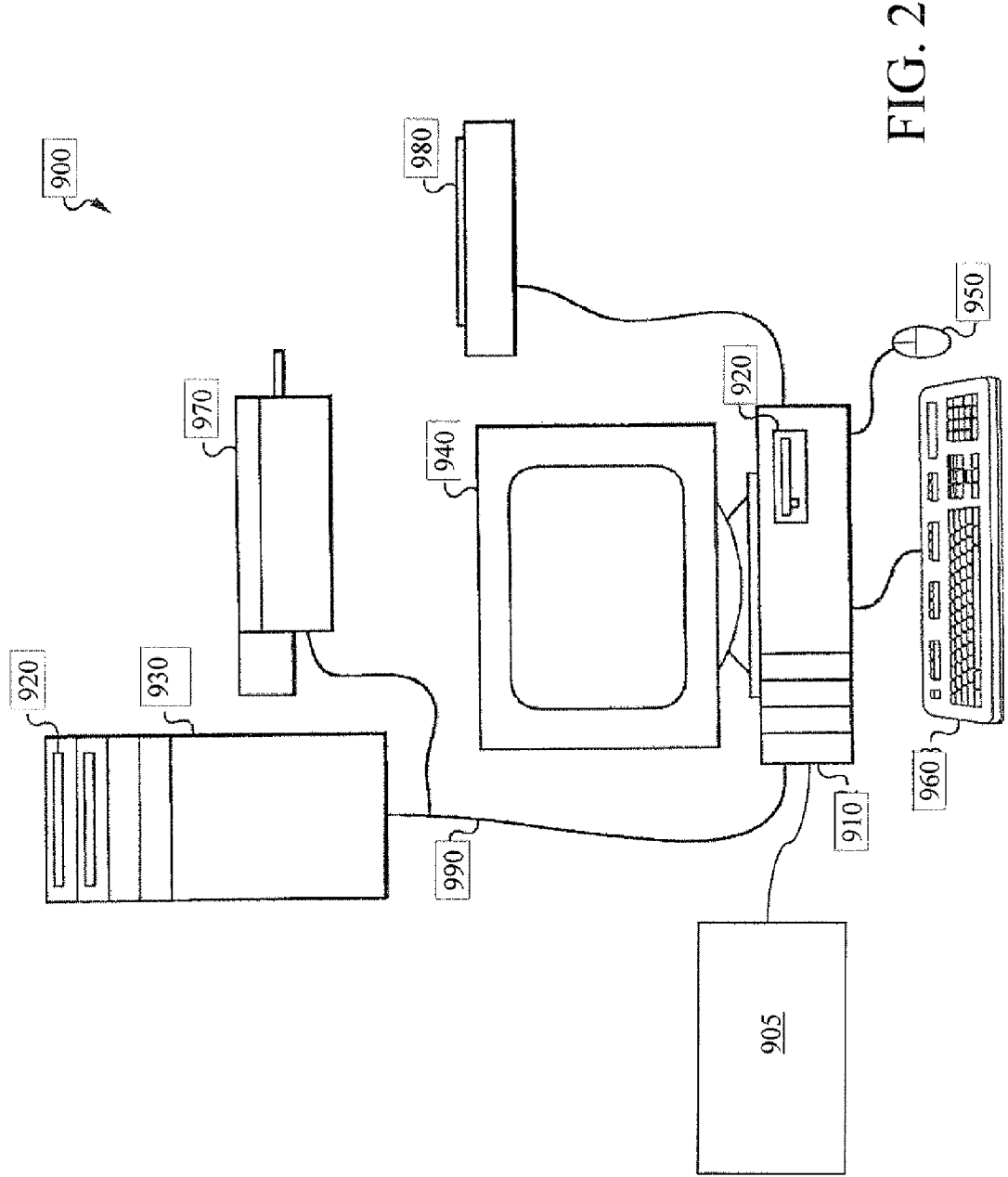
FIG. 2 illustrates an exemplary system for determining a target throughput for a product type in a manufacturing facility according to an embodiment of the present invention.

Referring to FIG. 2, an exemplary system 900 for determining a target throughput for a product type in a manufacturing facility is shown. The exemplary system 900 can be employed to perform all of the steps in FIG. 1. The exemplary system includes a computing device that is configured to perform program instructions. The computing device can include a memory and a processor device in communication with the memory. The program instructions can configure the computing device to perform the steps of embodiments of the present invention described above. The exemplary system 900 can be a computer-based system in which the methods of the embodiments of the invention can be carried out by an automated program of machine-executable instructions to determine throughput targets, set lot priorities based on these throughput targets, and dispatch lots for processing based on their priorities.

The computer-based system includes a processing unit 910, which can be a computing device and houses a processor device, a memory and other systems components (not shown expressly in the drawing) that implement a general purpose or special purpose processing system, or can be a computer that can execute a computer program product. The computer program product can comprise data storage media, such as a compact disc, which can be read by the processing unit 910 through a disc drive 920. Alternately or in addition, the data storage media can be read by any means known to the skilled artisan for providing the computer program product to the general purpose processing system to enable an operation thereby. The exemplary system 900 can include a data interface device 905 that is configured to capture and/or transmit snapshots of the WIP distribution of at least one product type that is manufactured in a manufacturing facility.

The exemplary system can be employed to determine throughput targets, set lot priorities based on these throughput targets, and dispatch lots for processing based on their priorities. The system includes at least a communication means 905, a memory, and a processor device in communication with the memory. The memory and the processor device are provided within the processing unit 910. The communication means 905 can be configured to transmit control signals to machines in a manufacturing facility and receive operational data from the manufacturing facility.

A data storage device that is programmable and readable by a machine and tangibly embodying or storing a program of machine-executable instructions that are executable by the machine to perform the methods described herein are also provided. For example, the automated program can be embodied, i.e., stored, in a machine-readable data storage devices such as a hard disk, a CD ROM, a DVD ROM, a portable storage device having an interface such as a USB interface, a magnetic disk, or any other storage medium suitable for storing digital data. The program of machine-executable instructions can be employed to determine throughput targets, set lot priorities based on these throughput targets, and dispatch lots for processing based on their priorities, employing a system of the present invention.

The computer program product can comprise all the respective features enabling the implementation of the inventive method described herein, and which is able to carry out the method when loaded in a computer system. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product can be stored on hard disk drives within the processing unit 910, as mentioned, or can be located on a remote system such as a server 930, coupled to the processing unit 910, via a network interface such as an Ethernet interface. A monitor 940, a mouse 950 and a keyboard 960 are coupled to the processing unit 910, to provide user interaction. The keyboard 960 and/or the mouse 950 can function as input means described above. The monitor can function as output means described above. Further, the data interface device 905 can function as input means and/or output means if the transmission of snapshots of the WIP distribution and/or the throughput target is automated. A scanner 980 and a printer 970 can be provided for document input and output. The printer 970 is shown coupled to the processing unit 910 via a network connection, but can be coupled directly to the processing unit 910. The scanner 980 is shown coupled to the processing unit 910 directly, but it should be understood that peripherals might be network coupled, or direct coupled without affecting the ability of the processing unit 910 to perform the method of the invention.

While the present invention has been particularly shown and described with respect to preferred embodiments thereof, it will be understood by those skilled in the art that the foregoing and other changes in forms and details may be made without departing from the spirit and scope of the present invention. For example, variations that combine various steps of the first, second, and third exemplary programs in a single program may be employed. It is therefore intended that the present invention not be limited to the exact forms and details described and illustrated, but fall within the scope of the appended claims.

What is claimed is:

1. A system for providing control signals for operation of a plurality of machines in a manufacturing facility, said system comprising a computer and a communication means, wherein said computer is configured to perform the steps of:

determining, for each machine within a plurality of machines in a manufacturing facility, an optimal workstation usage allocation for multiple types of products that are manufactured in said manufacturing facility by employing said computer;

determining, for each machine within said plurality of machines in said manufacturing facility, a queue of tots to be processed by each workstation under a constraint that, for each type of product in said manufacturing line, a long-term average of usage allocation is within a predetermined range from a corresponding optimal usage allocation by employing said computer;

transmitting control signals from said computer to said plurality of machines employing said communication means, wherein said control signals include said queues of lots; and an input means for inputting boundary conditions for determining said optimal usage allocations.

2. The system of claim 1, wherein said boundary conditions include a throughput target or a cycle time target for each of said multiple types of products, wherein said optimal usage allocations are determined under said boundary conditions.

3. The system of claim 1, wherein said step of determining of said optimal usage allocations includes the steps of:

initializing a long-term analytics engine embodying a long-term horizon model by providing operational data from said manufacturing facility; and constructing a long-term optimization model representation from said long-term analytics engine.

4. The system of claim 3, wherein said step of determining of said optimal usage allocations further includes the steps of generating long-term control signals by solving said long-term optimization model representation, wherein said long-term control signals include said optimal usage allocations.

5. The system of claim 1, wherein said step of determining said queues of lots includes the steps of:

initializing at least one short-term analytics engine by providing operational data from said manufacturing facility, wherein each of said at least one short-term analytics engine embodies a short-term horizon model; and constructing, for each of said at least one short-term analytics engine, a short-term optimization model representation a corresponding short-term analytics engine.

6. The system of claim 5, wherein said step of determining said queues of lots further includes the steps of generating short-term control signals by solving said at least one short-term optimization model representation, wherein said short-term control signals include said queues of lots.

7. The system of claim 6, wherein said at least one short-term horizon model is a plurality of short-term horizon models, wherein horizons of said plurality of short-term horizon models are different from one another.

8. The system of claim 1, wherein said step of determining said optimal usage allocations is effected by solving a long-term horizon model and said step of determining said queues of lots is effected by solving at least one short-term horizon model, wherein a horizon for said long-term horizon model is a period of time that is longer than any horizon for said at least one short-term horizon model.

9. The system of claim 8, wherein said manufacturing facility is a semiconductor device manufacturing facility, said horizon for said long-term horizon model is at least one week, and each of said at least one short-term horizon model has a horizon that is less than one week.

10. The system of claim 1, wherein said computer is configured to perform said step of determining said queues of lots at least twice during a time interval between two consecutive performances of said step of determining said optimal usage allocations.

11. A method for providing control signals for operation of a plurality of machines in a manufacturing facility, said method comprising:

determining, for each machine within a plurality of machines in a manufacturing facility, an optimal usage allocation for multiple types of products that are manufactured in said manufacturing facility by employing a computer;

determining, for each machine within said plurality of machines in said manufacturing facility, a queue of lots to be processed under a constraint that, for each type of product in said manufacturing line, a long-term average of usage allocation is within a predetermined range from a corresponding optimal usage allocation by employing said computer;

transmitting control signals from said computer to said plurality of machines employing communication means, wherein said control signals include said queues of lots; and inputting boundary conditions for determining said optimal usage allocations.

12. The method of claim 11, wherein said boundary conditions include a throughput target or a cycle time target for each of said multiple types of products, wherein said optimal usage allocations are determined under said boundary conditions.

13. The method of claim 11, wherein said determining of said optimal usage allocations includes:

initializing a long-term analytics engine embodying a long-term horizon model by providing operational data from said manufacturing facility; and constructing a long-term optimization model representation from said long-term analytics engine.

14. The method of claim 13, wherein said determining of said optimal usage allocations further includes generating long-term control signals by solving said long-term optimization model representation, wherein said long-term control signals include said optimal usage allocations.

15. The method of claim 11, wherein said determining said queues of lots includes:

initializing at least one short-term analytics engine by providing operational data from said manufacturing facility, wherein each of said at least one short-term analytics engine embodies a short-term horizon model; and constructing, for each of said at least one short-term analytics engine, a short-term optimization model representation a corresponding short-term analytics engine.

16. The method of claim 15, wherein said determining said queues of lots further includes generating short-term control signals by solving said at least one short-term optimization model representation, wherein said short-term control signals include said queues of lots.

17. The method of claim 16, wherein said at least one short-term horizon model is a plurality of short-term horizon models, wherein horizons of said plurality of short-term horizon models are different from one another.

18. The method of claim 11, wherein said determining said optimal usage allocations is effected by solving a long-term horizon model and said determining said queues of lots is effected by solving at least one short-term horizon model, wherein a horizon for said long-term horizon model is a period of time that is longer than any horizon for said at least one short-term horizon model.

19. The method of claim 18, wherein said manufacturing facility is a semiconductor device manufacturing facility, said horizon for said long-term horizon model is at least one month, and each of said at least one short-term horizon model has a horizon that is less than one week.

20. The method of claim 11, wherein said computer is configured to perform said step of determining said queues of lots at least twice during a time interval between two consecutive performances of said step of determining said optimal usage allocations.

21. A computer program product for providing control signals for operation of a plurality of machines in a manufacturing facility, the computer program product comprising a computer readable storage non-transitory medium having computer readable program code embodied therewith, wherein said computer readable program code is configured to perform the steps of:

determining, for each machine within said plurality of machines in said manufacturing facility, an optimal usage allocation for multiple types of products that are manufactured in said manufacturing facility by employing a computer that is configured to read said computer program code;

determining, for each machine within said plurality of machines in said manufacturing facility, a queue of lots to be processed under a constraint that, for each type of product in said manufacturing line, a long-term average of usage allocation is within a predetermined range from a corresponding optimal usage allocation by employing said computer; and transmitting control signals from said computer to said plurality of machines employing said communication means, wherein said control signals include said queues of lots; wherein said computer readable program code is configured to enable inputting of inputting boundary conditions for determining said optimal usage allocations into said computer.

22. The computer program product of claim 21, wherein said boundary conditions include a throughput target or a cycle time target for each of said multiple types of products, wherein said optimal usage allocations are determined under said boundary conditions.

23. The computer program product of claim 21, wherein said step of determining of said optimal usage allocations includes the steps of:

initializing a long-term analytics engine embodying a long-term horizon model by providing operational data from said manufacturing facility;

constructing a long-term optimization model representation from said long-term analytics engine; and generating long-term control signals by solving said long-term optimization model representation, wherein said long-term control signals include said optimal usage allocations.

24. The computer program product of claim 21, wherein said step of determining said queues of lots includes the steps of:

initializing at least one short-term analytics engine by providing operational data from said manufacturing facility, wherein each of said at least one short-term analytics engine embodies a short-term horizon model;

constructing, for each of said at least one short-term analytics engine, a short-term optimization model representation a corresponding short-term analytics engine; and generating short-term control signals by solving said at least one short-term optimization model representation, wherein said short-term control signals include said queues of lots.

25. The computer program product of claim 21, wherein said step of determining said optimal usage allocations is effected by solving a long-term horizon model and said step of determining said queues of lots is effected by solving at least one short-term horizon model, wherein a horizon for said long-term horizon model is a period of time that is longer than any horizon for said at least one short-term horizon model.

* * * * *